United States Patent
Folkvang

(12) United States Patent (10) Patent No.: US 8,277,547 B2
Folkvang (45) Date of Patent: *Oct. 2, 2012

(54) SEPARATOR TANK FOR SEPARATION OF FLUID COMPRISING WATER, OIL AND GAS

(75) Inventor: Jorn Folkvang, Stathelle (NO)

(73) Assignee: Schlumberger Norge AS, Stavanger (NO)

( * ) Notice: Subject to any disclaimer, the term of this patent is extended or adjusted under 35 U.S.C. 154(b) by 0 days.

This patent is subject to a terminal disclaimer.

(21) Appl. No.: 13/233,897

(22) Filed: Sep. 15, 2011

(65) Prior Publication Data

US 2012/0006201 A1 Jan. 12, 2012

Related U.S. Application Data

(63) Continuation of application No. 12/084,146, filed as application No. PCT/IB2006/053979 on Oct. 27, 2006, now Pat. No. 8,043,419.

(30) Foreign Application Priority Data

Oct. 28, 2005 (EP) ..................................... 05388088

(51) Int. Cl.
*B01D 19/00* (2006.01)

(52) U.S. Cl. ................. 96/182; 96/183; 96/212; 95/243; 95/253; 210/788; 210/512.2; 210/512.1

(58) Field of Classification Search ................... 95/243, 95/245, 258, 261, 253, 259; 96/182, 183, 96/185, 186, 202, 209, 210, 211, 212; 210/788, 210/512.2, 512.1
See application file for complete search history.

(56) References Cited

U.S. PATENT DOCUMENTS

| | | | |
|---|---|---|---|
| 2,302,116 A | 11/1942 | Gill | |
| 3,753,336 A | 8/1973 | Drew et al. | |
| 4,203,961 A * | 5/1980 | Cowley | 423/478 |
| 4,273,563 A * | 6/1981 | Fadda et al. | 96/209 |
| 4,369,047 A | 1/1983 | Arscott et al. | |
| 4,376,676 A | 3/1983 | Gill | |
| 4,424,068 A | 1/1984 | McMillan | |
| 4,428,839 A * | 1/1984 | Davies et al. | 95/253 |

FOREIGN PATENT DOCUMENTS

| WO | WO 96/27423 | 9/1996 |
|---|---|---|
| WO | WO 2005/079946 | 9/2005 |
| WO | WO 2005079946 A1 * | 9/2005 |

* cited by examiner

*Primary Examiner* — Duane Smith
*Assistant Examiner* — Douglas Theisen
(74) *Attorney, Agent, or Firm* — Jacobson Holman PLLC

(57) ABSTRACT

A separator tank comprises an essentially cylindrical vertical tank (1) having an upper part (6) and a lower part (7), a tangentially arranged inlet (2) for fluid in the upper part of the tank, at least one first outlet (4) in the upper part of the tank, at least one second outlet (3) in the lower part of the tank, and means (12) for calming a stream around the second outlet. An inner annular wall (5) has a first opening (8) at an upper end of said inner annular wall to allow communication between the upper part and the lower part of the tank. The separator tank comprises a rod-shaped vortex eye breaker (11) extending vertically at the center of the tank in order to improve the capacity of the tank.

16 Claims, 4 Drawing Sheets

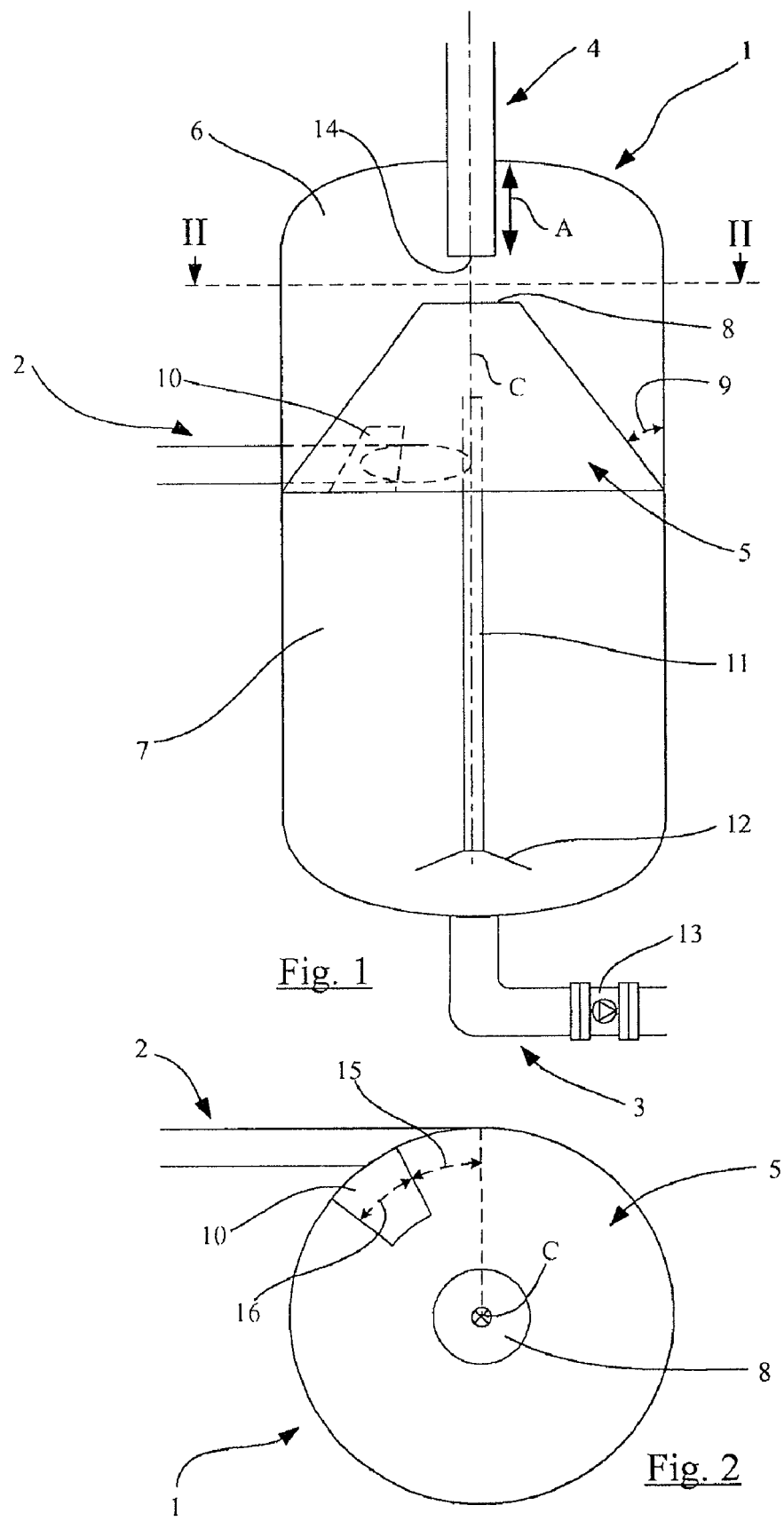

SEPARATOR TANK FOR SEPARATION OF FLUID COMPRISING WATER, OIL AND GAS

Figure 3:
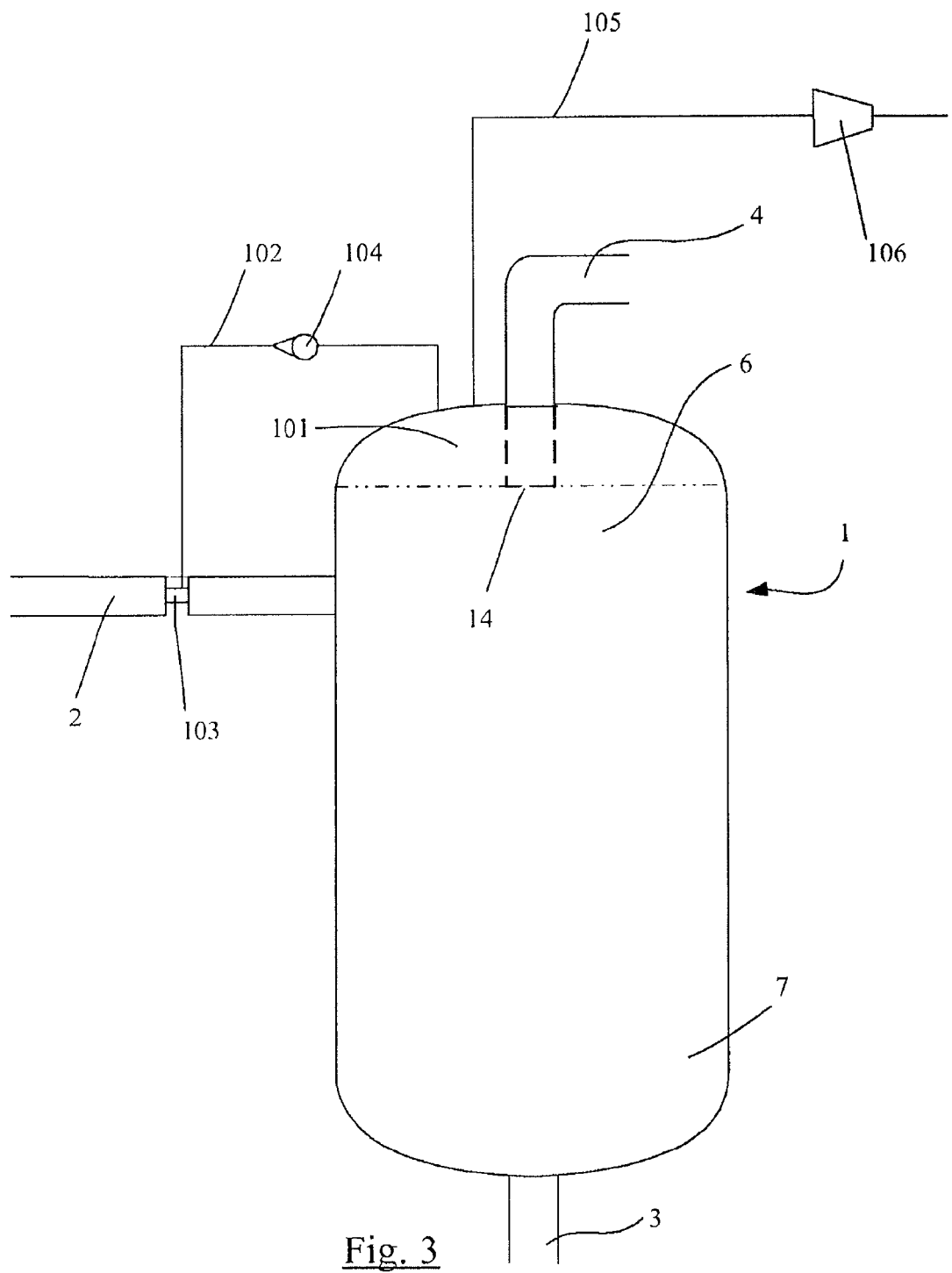

This application is a continuation application of U.S. application Ser. No. 12/084,146, filed Feb. 2, 2009, which issued Oct. 25, 2011, as U.S. Pat. No. 8,043,419, the disclosure of which is incorporated by reference as if fully set forth herein, which is a nationalization of PCT/IB2006/053979 filed Oct. 27, 2006, and which claims priority to EP 05388088.6 filed Oct. 28, 2005.

The invention relates to a separator tank for separation of fluid comprising water, oil and gas, and comprising an essentially cylindrical vertical tank having an upper part and a lower part, a tangentially arranged inlet for fluid in the upper part of the tank, an inner annular wall, at least one first outlet in the upper part of the tank, at least one second outlet in the lower part of the tank, and means for calming a stream around the second outlet; said inner annular wall having a first opening at an upper end of said inner annular wall to allow communication between the upper part and the lower part of the tank.

A tank of such a kind is described and illustrated in Applicant's WO 2005/079946 where the inner annular wall is cylindrical, and the means for calming a stream around the second outlet is a disc-shaped plate extending across the second outlet at a distance above the second outlet. This disc-shaped plate calms the stream at the outlet by breaking up the vortex flow in the fluid flowing past the plate in order to reach the second outlet.

In the oil industry the production of crude oil involves a mixture of oil, gas and water from subterranean reservoirs. At the well head an initial separation usually takes place in one or more stages to remove additional water and gas before the crude oil is ready to be discharged for export. After the initial separation, the crude oil and the gas may be further purified prior to discharge for refining etc. After further purification the water and sand is usually optionally discharged into a suitable recipient such as the sea or into a reservoir.

When maturing oil and gas fields it is often found that the volume of water accompanying the oil and gas becomes much larger and, consequently, the larger volumes of produced water must be treated at the well head production facility in order to maintain an acceptable production rate.

Further, there is general concern as to the pollution caused by oil production at sea, particularly when oil production takes place in areas that are considered environmentally fragile, such as arctic areas or fishing areas. In the oil industry there is a fear that demand for a significantly lower outlet limit for oil would make oil production from a number of known reservoirs uneconomical if they have to rely on the equipment used at present. Thus, great efforts have been made by the industry and the authorities to find ways to reduce the outlet of oil during oil production at affordable prices.

On oil and gas production platforms intended for operation off-shore limited space is usually available. Therefore there are very strict constraints on the space available for installation of equipment. An even stricter constraint on space may be encountered if the establishment of production and separation at the sea bed level is considered.

An object of the present invention is to provide an oil-gas-water separator having an improved separation capacity without taking up more space. With a view to this, the separator tank according to the present invention is characterized by comprising a rod-shaped vortex eye breaker extending vertically at the centre of the tank. The rod-shaped vortex eye breaker is elongate and may extend along the vertical centre line of the tank. The vortex eye breaker serves to increase the capacity of the tank by acting on the vortex at the centre thereof so that it has a reduced tendency to form a vortex eye. The rod-shaped vortex eye breaker thus allows the vortex flow to have a higher angular velocity (a more forceful swirl) without a vortex eye being formed at the centre of the vortex flow. The vortex eye breaker acts to stabilise and enforce the vortex flow.

In an embodiment the vortex eye breaker extends from the lower part of the tank and upward past a lower rim of the inner annular wall. This embodiment is in particular advantageous when the inner wall at the lower rim has a diameter larger than 40% of the inner diameter of the tank. When the inner wall has large diameter at the lower rim the vortex flow in the lower part of the tank can extend up inside the inner wall and benefit from the presence of the vortex eye breaker inside the inner wall.

Although it is possible for the vortex eye breaker to be embodied in such a manner that it extends upwards through the first opening, it is preferred that an upper end of the vortex eye breaker is located at a distance below the first opening in the inner annular wall so that fluid flows through the first opening occur largely unhindered by the vortex eye breaker.

In a preferred embodiment the rod-shaped vortex eye breaker is co-axial with the tank. The symmetry obtained by such a positioning of the vortex eye breaker acts to further enhancing the vortex flow.

It is preferred that the rod-shaped vortex eye breaker has a length in the range from ½ to ⅚ of the height of the tank. The vortex eye breaker can have a shorter length than half of the tank height, e.g. in some designs where the inner wall extends down into the lower half or the lower third of the tank, but the best effect is obtained with a longer vortex eye breaker.

A particularly simple and effective design is obtained when the rod-shaped vortex eye breaker is attached to the means for calming a stream around the second outlet. The means for calming the stream is then supporting the lower end of the vortex eye breaker so that separate mounting means can be dispensed with. The rod may e.g. extend upwards into the tank from a disc that is placed in a horizontal position above the second outlet in the lower part of the tank.

In one embodiment the inner annular wall is cylindrical, and in this embodiment the rod-shaped vortex eye breaker extends in parallel with the inner annular wall, and preferably co-axial therewith. The annular wall and the vortex eye breaker thus interact in mutually supporting manner on the central vortex flow on the outside and at the centre thereof.

In an alternative embodiment the inner annular wall is a conical frusta shaped wall, and an inner wall with this shape can advantageously be utilized for dividing the upper part of the tank from the lower part of the tank. In such an embodiment one vortex flow can occur in the upper part of the tank and another vortex flow in the lower part of the tank. As already indicated in the above description, the vortex eye breaker preferably has a length less than the full height of the tank, and when the vortex eye breaker extends from the bottom end area of the tank it primarily influences the vortex flow in the lower part of the tank.

The rod serves to prevent formation of a vortex eye, a zone free of water and oil, in the central part of the separator. Formation of such a zone will decrease the capacity of the separator. The separator tank according to the invention has a favourable relationship between size and capacity, presumably caused by the formation of a "double vortex" in the separator. The unique design of the interior of the separator is assumed to generate a flow that promotes the formation of a "double vortex", which again will promote the flotation and phase separation in the separator, and thereby result in a very efficient separation.

The annular wall, which is e.g. a conical frustra shaped wall, in connection with the tangentially arranged inlet forces the incoming fluid containing a mixture of water, oil and gas to form a vortex flow in the upper part of the separator tank.

Moreover, the annular wall is open at the top to allow communication between the upper part and the lower part of the tank. The opening ensures that a vortex flow is also formed in the lower part of the separation tank. Furthermore, the opening allows oil and gas to accumulate in the upper part of the tank and the water phase to flow downwards into the lower part of the tank.

The at least one first outlet (for oil and gas, or for gas) in the upper part of the tank may be arranged to have an ejecting effect. This ejecting effect is achieved by pressure build-up by gas in the upper part of the tank. In particular when the first outlet extends a distance (e.g. 5-30 cm) down into the tank, gas from the mixture comprising water, oil and gas may accumulate in the space in the upper part of the tank defined by the top of the tank and the location of the outlet opening to the first outlet. In such an arrangement a pressure build up will take place by accumulating gas until the gas has displaced the liquid part of the mixture in the tank to a level just below the outlet opening to the first outlet. At this point gas and oil will be ejected through the first outlet and leave the tank. The level of the liquid mixture will rise to above the outlet for oil and gas and a new pressure build up will take place. In this manner oil is automatically skimmed from the top of the water in the tank. Depending on the location of the outlet opening to the first outlet, the pressure build-up and rejection may take place in less than one second.

The means for calming a flow around the second outlet (for water or for oil) can be embodied as a disc with a circular circumference optionally placed horizontally just above the second outlet. As an alternative the means for calming the flow around the second outlet may be conical or hemispherical shaped. In any case the means can establish a calm flow around the outlet for water, and this improves the efficiency of the tank.

In an embodiment of the tank, the first opening at the upper end of the annular wall has a diameter in the range of 15% to 40% of the internal diameter of the wall of the tank. Larger or smaller values are possible, but the range mentioned is suitable when the annular wall is a conical frusta shaped wall and this range provides a suitable interaction between the vortex flow in the upper part of the tank and the vortex flow in the lower part of the tank. In a further development of this embodiment it is preferred that said diameter is in the range of 20% to 30% of the internal diameter of the wall of the tank, such as a diameter of about 25% of the internal diameter of the wall of the tank. With a diameter of said 25% the first opening has a larger diameter than the diameter of the outlet opening to the first outlet. This brings the advantage that variations in the liquid level in the area of the outlet opening to the first outlet do not suppress fluid flow up through the first opening.

Preferably, the second outlet is located a larger distance from the annular wall than the distance between the annular wall and the first outlet. The lower part of the tank consequently has a larger volume than the upper part of the tank. This embodiment is in particular suitable for processing a well fluid flow having a high content of water.

In order to improve the capacity the separator tank preferably has the first outlet coaxial with the first opening. The first outlet can be located to a side in the top of the tank, but the central location and vertical extent obtained when the first outlet is coaxial with the first opening result in a more regular vortex flow in the upper part of the tank, and to some degree also in the lower part, as the two vortex flows influence one another.

When the tank is embodied with a vortex eye breaker formed as a rod the regularity of the vortex flow can be increased primarily in the lower part of the tank, and to some degree also in the upper part of the tank, by locating the rod so that it is coaxial with the first opening.

Preferably the first opening and the first outlet and the second outlet are coaxial. This coaxial location of both outlets and the first opening acts together with the circular cylindrical tank wall to produce very efficient vortex flows in the tank.

In a further embodiment the separator tank further comprises means for gas injection provided at the tangentially arranged inlet, whereby the gas is injected into the incoming fluid in the tank. Subsequently, the gas forms small bubbles in the fluid that promote separation. The gas used for gas injection may be any gas suitable for forming bubbles in the fluid, e.g. $CO_2$, nitrogen or a gas based on hydrocarbons, and preferably the gas is recycled gas from a water/oil/gas separation. The amount of gas added is typically in the range of 0.02 to 0.2 $St.m^3$ per 1 $m^3$ of fluid. Values in the range of 0.05 to 0.18 $St.m^3$ per 1 $m^3$ of fluid are preferred, but higher values for the amount of gas added can also be used, such as an amount of up to 0.3 $St.m^3$ per 1 $m^3$ of fluid. $St.m^3$ is standard cubic meters of the gaseous medium. $St.m^3$ is standardised within the offshore field (volume of dry gas at 15.6° C. and a pressure of 101.325 kPa).

Using gas from an external source has several disadvantages. The supply of gas has to be maintained, and the gas is to some extent consumed so that new gas supplies have to be obtained at intervals. And the systems on the downstream side of the separator tank have to handle the additional flow caused by added gas.

In a preferred embodiment the gas source for the means for gas injection is a gas zone in the upper part of the separator tank. Gas separated out from the inlet fluid is consequently used as a source for gas to be added to the inlet fluid, and in this manner savings in external gas supplies are obtained. In an even more preferred embodiment the gas zone in the upper part of the separator tank is the sole gas source for the means for gas injection. This makes it possible to completely dispense with installing external supplies for gas, and the separator tank system thus has a more simple design.

In a further embodiment a conduit from the gas zone in the upper part of the tank is connected to an eductor in the inlet to the same tank. The eductor has the advantage of no moving parts and thus high reliability. The reliability of the separator tank as such is consequently improved in comparison to an embodiment using external supply of gas, also because the fluid, such as produced water, automatically provides the supply of gas.

In yet an embodiment the conduit from the gas zone in the upper part of the tank is in open direct flow connection with the eductor in the inlet to the same tank, during operation of the tank. There is consequently no pump in said conduit. A flow indicator can be provided in the conduit but that does not prevent the open direct flow connection. The means for gas injection embodied in this manner are completely self-sustained and automatically operating at very high reliability.

The separator tank according to the present invention makes is possible to separate a stream of cleaned water from the other constituents of the well fluid comprising water, oil and gas, and the stream of cleaned water has a high degree of purity. The oil phase and the gas phase can be discharged for use or further treatment, and the stream of cleaned water can be returned to the environment, e.g. the sea or the reservoir. The separator tanks have no moving parts, and they are highly robust to processing well fluid of varying compositions. And the tank is efficient in cleaning the water also when the well fluid contains a large proportion of water. The tank is consequently well suited to prolong the productive life of matured oil and gas fields where the water content is high in the fluid stream from the well head, typically because water has been injected into the reservoir for years while oil has been produced.

In a preferred embodiment of the method, the fluid or liquid in the first tank and/or second tank and/or third tank has been subjected to gas injection upstream of the inlet opening to the tank. Thus, gas injection may be applied in one of the separation tanks only, in two of the separation tanks, or in all of the separation tanks. The injected gas facilitates the flotation process separating the water from the gas. As the best results are achieved when the gas is dispersed in the fluid as tiny bubbles, it is preferred that the gas is injected into the fluid in the inlet duct via a nozzle device located only a short distance from the inlet opening to avoid the tiny gas bubbles merging to form bigger gas bubbles which do not have the same efficiency. The gas injection is preferably performed in the inlet to the tank and, more preferably, the means for gas injection are located in the inlet pipe in close vicinity to the inlet opening, e.g. 5 to 50 cm from the inlet opening. The nozzle or nozzles for injection may in this case be a ring shaped type. The gas to be injected is optionally recycled gas from the separation process, e.g. natural gas. However, the gas may also be nitrogen, carbon dioxide or mixtures of gasses.

The separator tanks according to the present invention can be used in a configuration with two or more separator tanks coupled in series or in parallel in order to obtain a better phase separation. A further possibility is to use separator tanks both in series and in parallel. How the separator tanks should be connected depends on the specific situation. In any case, this will be a matter for a skilled person to deal with as a matter of routine. The separator tanks according to the invention are used for separating fluid originating from a well head in oil and gas production, and typically the well fluid fed to the separator tanks is a water-rich waste stream separated off from the well stream delivered by the well head. Such an initial separation into an oil/gas phase and a water phase can occur in one or more separation steps. The separator tank or tanks may e.g. be used in an intermediate cleaning step of a water stream containing small amounts of oil and gas, or e.g. be used in a final cleaning step of such a water stream, or the separator tank can be used on the main stream from the well head, preferably when a significant part of this stream is water, or on a partial stream thereof, and possibly on a partial stream from another separator. In any case the water, oil and gas originate from a well head and are as such in the present context considered well fluids irrespective of where in the production facility the separator is actually used to separate a stream of fluid.

The use further includes an embodiment wherein the oil/gas phase is separated into an oil phase and a gas phase in an additional separation step.

Figure 4:
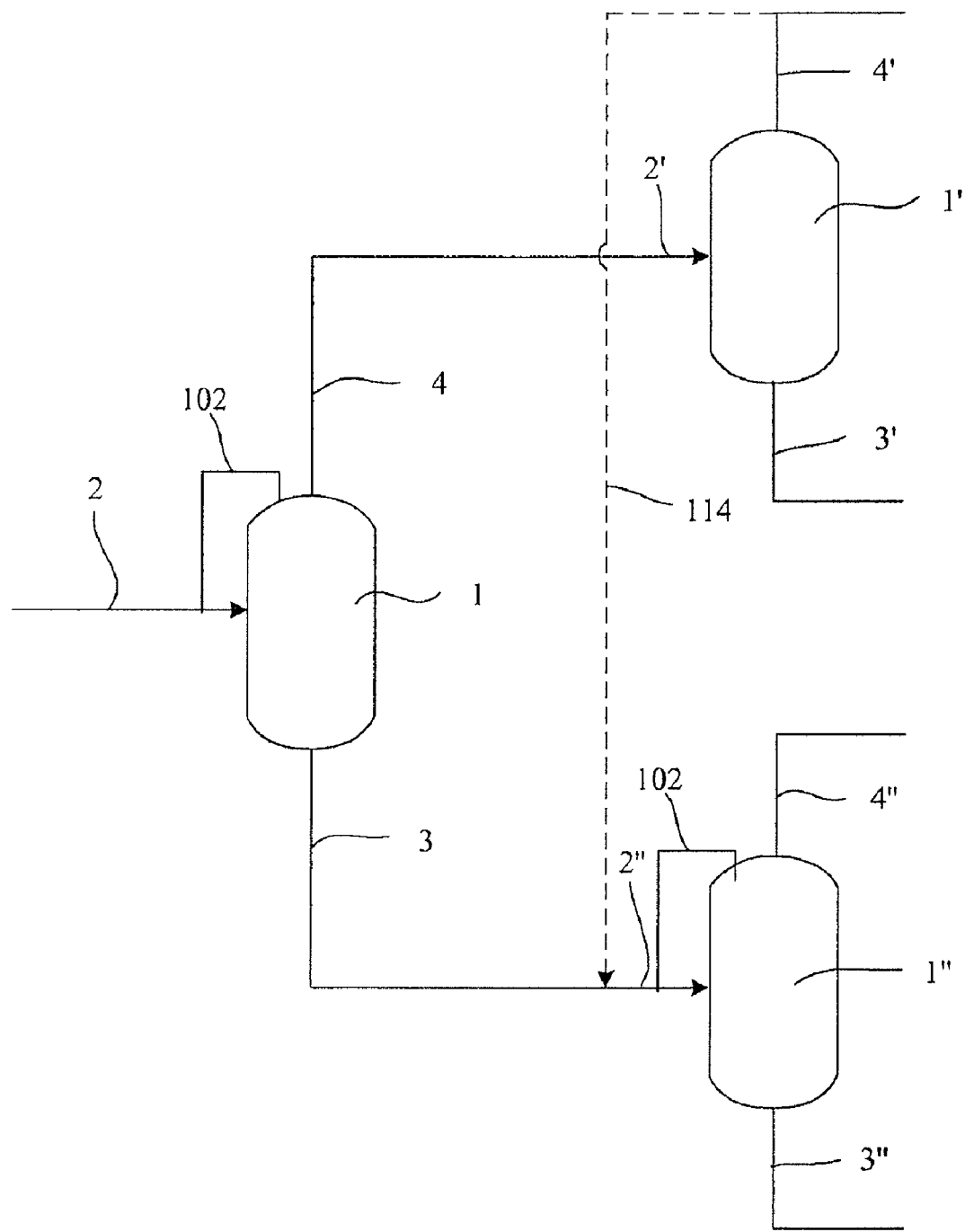
Figure 5:
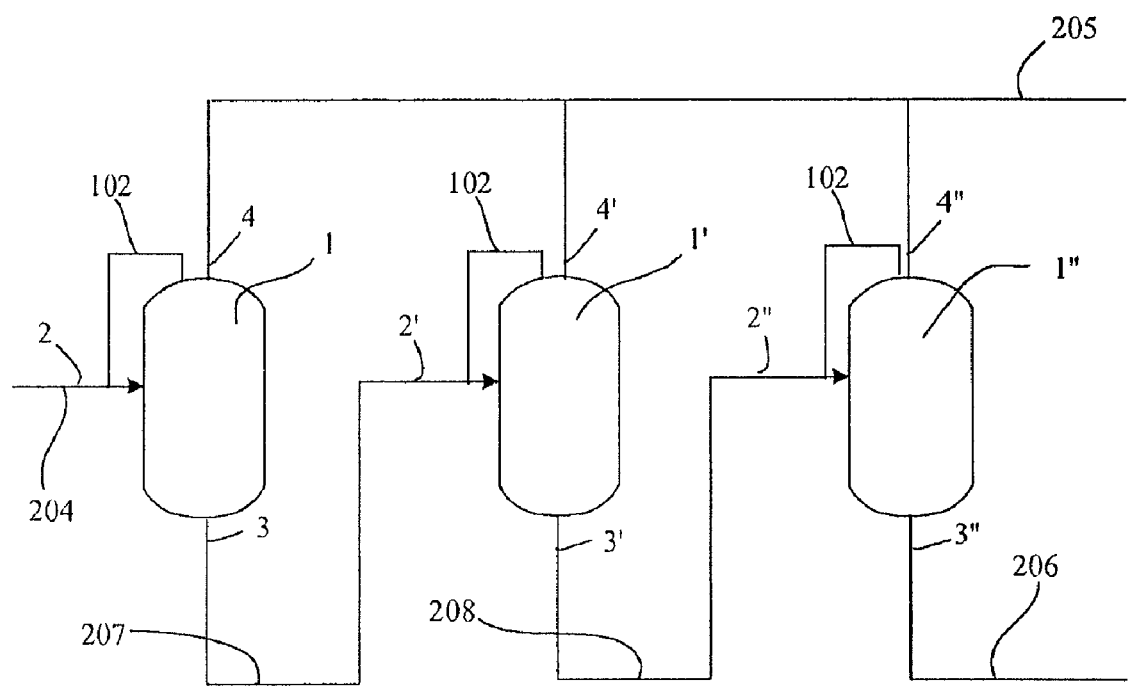
Figure 6:
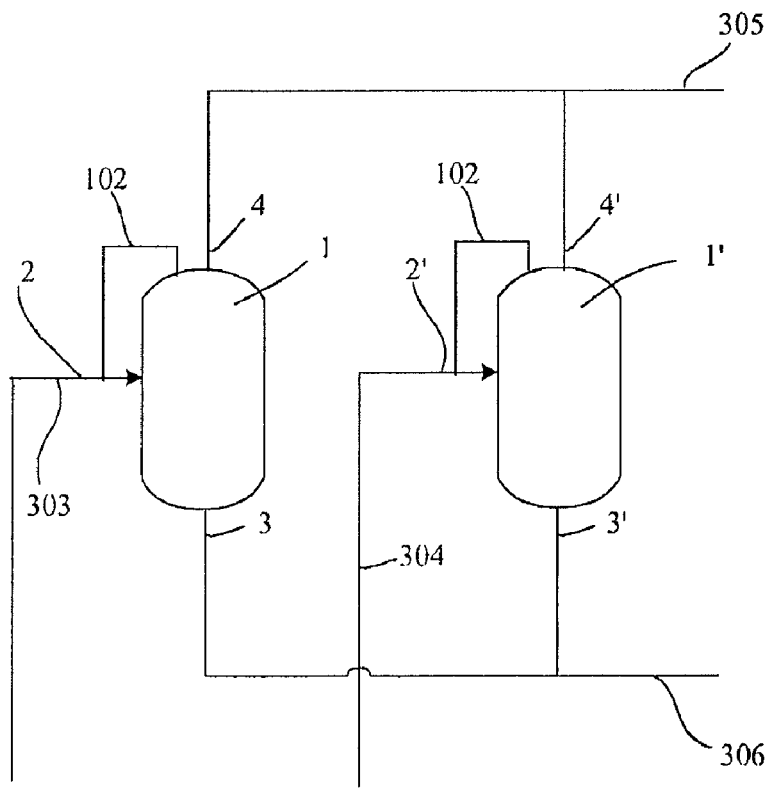

In the following, illustrative, non-limiting examples of embodiments of the invention will be described in further detail with reference to the highly schematic drawings in which FIG. 1 depicts schematically an embodiment of a separator tank according to the present invention, FIG. 2 depicts the separator tank in FIG. 1 viewed from above at the cross sectional broken line II-II, FIG. 3 depicts a further embodiment according to the present invention, FIG. 4 depicts an arrangement where three separator tanks according to the invention are used for separating a fluid comprising oil, gas and water, FIG. 5 depicts an arrangement where separator tanks according to the invention are used in series, and FIG. 6 depicts an arrangement where separator tanks according to the invention are used in parallel.

The embodiment illustrated in FIG. 1 of a separator tank 1 according to the invention is a substantial cylindrical tank with a tangentially arranged inlet 2 for fluid, such as a mixture comprising water, oil and gas. Inlet 2 extends to an inlet opening in the wall of the tank. The tank 1 further comprises a first outlet 4 at the top of the tank and a second outlet 3 at the bottom of the tank. The first outlet is typically for fluid having less density than the fluid taken out through the second outlet. The second outlet 3 can e.g. be for water, and the first outlet 4 can e.g. be for oil/gas. The separator tank 1 is a well fluid separator tank, and the liquid mixture may originate from a fluid stream of the well head or it may originate from a branch stream of a fluid stream, or from a stream separated of from any such streams.

Just below the level of the inlet 2 the lower rim of an annular wall 5 of conical frusta shape is attached to the tank wall. The conical frusta shaped wall protrudes upwards and inwards from the lower rim and divides the tank into an upper part 6 and a lower part 7. The annular wall 5 has a first opening 8 at the upper end to allow communication between the upper 6 and lower part 7 of the tank 1. The angle indicated with curved arrow 9, between the vertical sidewall of the tank 1 and the upper side of conical frusta shaped wall is in the range between 15° and 70°, preferably between 20 and 50°. This expresses the inclination of the conical frusta shaped wall.

The conical frusta shaped inner annular wall 5 is besides the first opening 8 equipped with a second opening 10 at the level of the inlet 2. As shown the second opening 10 is located in the conical frusta shaped wall in such a way that a liquid coming into the separator tank 1 from the inlet 2 will rotate about 300° around the upper part of the conical frusta shaped wall in the upper part 6 of the tank before passing through the second opening 10 into the lower part of the tank 7. The second opening 10 in the conical frustra shaped wall serves to facilitate and enhance the formation of a vortex in the lower part of the tank. To obtain an improved effect the second opening is preferably located at the level of the inlet.

For further improvement, the second opening may be located in the conical frusta shaped wall in the vicinity of the inlet, e.g. in such a manner that the incoming flow from the inlet does not directly enter the second opening. Thus, it is preferred that the second opening is located just before the inlet zone, so that the incoming fluid will at least circulate almost one time (almost a full turn) around the conical frustra shaped wall before it enters the second opening and the lower part of the separator. The second opening 10 can be located in the conical frusta shaped wall in such a way that fluid coming into the separator tank from the inlet will make at least a 300° circular movement in the upper part of the tank before passing through the second opening. This arrangement helps to ensure that a proper vortex formation takes place in the upper part of the tank, which again will provide for an excellent separation of the different fractions to be separated in the incoming fluids. A diminutive amount of the incoming mixture may unavoidably enter the second opening more or less directly. However, this will have no significant influence on the vortex formation as long as the major part of the incoming mixture is forced around the conical frusta shaped wall in the upper part of the tank before entering the second opening.

Although the second opening may have any desired shape, e.g. circular or oval, it is preferred that the second opening is substantially rectangular and that the height and width of the second opening have dimensions in the range from 1 to 2 times the inner diameter of the inlet.

The tangential inlet 2 in combination with the cylindrical wall of the tank 1 provides for a formation of a vortex flow in the upper part of the tank and of a vortex flow in the lower part of the tank. However, the vortex flow may form a vortex eye in the centre of the tank which eye is free of liquid mixture. The formation of a vortex eye is undesired due decreased capacity. It has appeared than the formation of a vortex eye can be avoided by placing a rod-shaped vortex eye breaker, such as a vertically extending rod 11 in the centre of the tank 1. The rod 11 extends approximately ⅔ of the tank height into the tank from the bottom area of the tank where the rod is attached to a conical member 12 that covers the second outlet 3, when viewed from above, and thus is a means for calming a stream around the second outlet. The conical member 12 may e.g. be attached to the wall of the tank 1 by use of two or more flat bars. Also rod 11 can be attached to the wall of the tank or to the inner annular wall 5 by several flat bars or other supporting or bracing members, such as round metal.

As indicated on FIG. 1 the second outlet 3 is equipped with a valve 13. By adjusting this valve 13 the pressure build-up by gas released from the mixture in the tank can be adjusted. The gas released from the mixture is collected in the upper part of the tank 6. The more gas that is collected the higher the pressure becomes. As the pressure of the gas increases the gas displaces the liquid mixture in the tank 1. When the collected gas has displaced the liquid mixture to a level below an outlet opening 14 to the first outlet 4, gas and oil are ejected out of the tank via the outlet 4 due to gas pressure. As illustrated in FIG. 1 the first outlet 4 is a pipe extending down into the upper part of the tank to the outlet opening 14 which is located at a distance A below the top of the tank.

The first opening 8 in annular wall 5 is upwards open into the upper part of the tank, which upper part of the tank is downwards delimited by the upper side of the conical frusta shaped wall. The first opening 8 is located at centre line C of tank 1 and is preferably coaxial therewith. The cylindrical wall of tank 1 extends in parallel with centre line C between the curved end bottoms of the tank. Rod 11 is also coaxial with centre line C and the first outlet extends coaxially with centre line C. The first opening 8 is consequently located opposite outlet opening 14 and has a larger diameter than outlet opening 14.

FIG. 2 illustrates a cross section of the tank 1 taken along line II-II in FIG. 1. The incoming well fluid feed enters tank 1 via the tangentially arranged inlet 2 and substantially all of the feed circles around the inner annular wall 5 with the first opening 8 at the top of the wall 5 before it may enter through opening 10. The angle 15 is preferably in the range 20-30°, more preferably 25°. The angle 16 defining the horizontal extension of the opening 10 is preferably in the range 30-40°, more preferably in the range 35°.

In another embodiment the inner annular wall is cylindrical as described and illustrated in Applicant's WO 2005/079946 and the description and drawings thereof are hereby by reference incorporated into the present application.

Gas can be injected into the fluid flowing through inlet 2. In one embodiment (not illustrated) gas, such as nitrogen or fuel gas, is supplied to inlet 2 from an external source. In a preferred embodiment illustrated in FIG. 3 gas is taken out from a gas zone 101 in the upper part 6 of the separator tank. The gas flows from gas zone 101 through conduit 102 and into an eductor 103 mounted in inlet 2 to tank 1. The eductor is embodied as a conduit part having a short length and having a smaller cross-sectional area than the adjacent conduit parts forming inlet 2. Due to the reduced area the velocity is higher in the fluid flow through the eductor than in the adjacent parts of the inlet, and as a result the fluid pressure in the eductor is relatively low so that gas is sucked from conduit 102 into the fluid flowing through the eductor.

Conduit 102 is provided with a flow indicator 104 or flow sensor, which does not prevent the eductor from being in open direct flow connection with gas zone 101 when the separator tank is operating. Gas zone 101 also communicates with an gas outlet line 105 provided with a compressor 106 to increase the pressure in the outlet gas. In the embodiment illustrated in FIG. 3 the means for gas injection to the inlet of the separator tank are completely self-sustained and automatically operating.

The embodiment of FIG. 3 has an additional advantage in that the gas system is in flow balance in the sense that the surplus gas taken out through gas outlet line 105 corresponds to the difference between the gas supplied with the fluid inflow through inlet 2 and the gas leaving through first outlet 4. The flow of gas into the tank is larger, and preferably much larger, such as at least 50% larger or 100% larger, than the aggregate gas flow out of first outlet 4 and gas outlet line 105.

In another embodiment the gas injection is performed in the inlet to the tank, and the means for gas injection are located in the inlet pipe in close vicinity to the inlet. The nozzle for injection may in this case be of a ring shaped type.

The separator tank according to the invention is usually operated at a pressure determined mainly by the pressure with which the fluid leaves the well head, however the pressure may also be increased or reduced before entering the separator tank using known procedures. The separator tank may be operated at a pressure corresponding to atmospheric pressure and upwards.

The dimensions of the separator may be selected depending on the amounts of fluid intended to be treated. In operation is has been found that the residence time in the tank for a fluid to be treated should be from about 20 seconds and upwards, preferably the residence time is in the range of 20 to 300 seconds, more preferably 25 to 240 seconds.

For the separation tank according to the invention, an efficient separation volume may be calculated as the volume of the space bounded by the tank and the height of the liquid in the tank. Based on the residence time the capacity of the tank may be calculated, e.g. a tank with an efficient separation volume of 1 m$^3$ and a residence time for the liquid of about 30 seconds has a capacity for treating about 100 m$^3$ fluid per hour.

The ratio of height to diameter of the tank can be selected within wide limits preferably in the range of 1:1 to 4:1 more preferably from 1:1 to 2:1, but the tank can also have a height larger than four times the diameter.

It is within the abilities of a person skilled in the art to select materials used for the construction of the tank based on the actual conditions for the intended use, such as the amounts of liquid to be treated, the composition of said liquid, the selected pressure, the temperature of the liquid and the presence of possibly corrosive chemicals in any of the phases of the mixture.

During operation the rate with which the separated phases are withdrawn (rejected) via the respective outlets determines where the inter-phases between gas and oil, or gas and water, oil and water, and water and possible solids are located in the tank. The skilled person will appreciate how to adjust the rate of withdrawal via the respective outlets so that the optimal separation will be achieved.

Because of the way the separator tank according to the invention is constructed with all surfaces vertical or having a steep inclination except for guide vane and vortex breaker and no narrow passages in the tank, there is no place in the separator, which is susceptible to clogging or deposition of solid materials. Therefore the separation of the well fluid at the production facility at the well head may be performed essentially continuously without or only with a minimal need for maintenance of the separator tank.

Further maintenance, when it is necessary even though it is in-frequent, can easily be performed due to the well-thought-out design of the separator tank.

Thus the separation of the fluid at the well head or in the well stream according to the invention has a remarkable robustness i.e. it can be run for long periods without interruptions, and the few stops that may be required for maintenance can be made short.

The high capacity combined with the minimum space requirements and the robustness of the separation tank according to the invention makes it particularly suited for use at off-shore installations such as oil and gas production platforms. Furthermore, it is also well suited for use in oil and gas production located on the sea bed, because at such a location the constraints on space may be even stricter than on traditional oil and gas production platforms and the capacity for maintenance may be lower. The separator tank is highly useful in oil and gas production both on-shore and off-shore.

Now the invention will be further illustrated by examples, which should not be regarded as limiting the invention. The same reference numerals as in the above is used for indicating the same details, however the numerals may be provided with apostrophe(s) in order to discern the one tank form the other.

EXAMPLES

1. Use of Three Separation Tanks According to the Invention as Separators for Three Phase Separation.

With reference to FIG. 4 use of separation tanks for separating a well stream comprising oil, gas and water is schematically depicted.

The use includes three separator tanks 1, 1' and 1" according to the invention. The first outlet 4 of tank 1 is for oil and gas and is connected to the inlet 2' on tank 1'. Likewise, the second outlet 3 of tank 1 is for water (with minor amounts of oil and gas) and is connected to the inlet 2" on tank 1".

The well fluid separated from the well head is lead to tank 1 via inlet 2. In tank 1 the fluid is separated into a gas and oil phase and a water phase. The gas and oil phase is taken out from tank 1 via first outlet 4 and lead to tank 1' via inlet 2'. The water phase (with minor amounts of oil and gas) is taken out from tank 1 via second outlet 3 and lead to tank 1" via inlet 2".

In tank 1' the gas and oil phase is separated into gas, which leaves tank 1' via first outlet 4', and oil, which leaves tank 1' via second outlet 3'.

In tank 1" the water phase is separated into water and oil/gas. The oil/gas leaves tank 1" via first outlet 4" and a stream of cleaned water leaves tank 1" via second outlet 3".

In order to improve the separation in the tank 1" further gas may be injected at inlet 2" into the incoming well fluid stream from the second outlet 3. The gas for injection may be a part of the recovered gas from first outlet 4', as indicated by the broken line 114.

The two tanks 1 and 1" are provided with a conduit 102 connecting the gas zone in the tank with an eductor in the inlet 2 and inlet 2", respectively. Optionally tank 1' may also be provided with such a conduit 102.

By the described arrangement a fluid from a well head comprising oil, gas and water is very effectively separated into an oil phase, a gas phase and a water phase, where the stream of cleaned water leaving tank 1" via the second outlet 3" contains less than 10 ppm impurities.

2. Use of Three Separator Tanks According to the Invention as Separators in Series.

FIG. 5 schematically depicts three tanks 1, 1', and 1" connected in series for separating a well stream 204 from a well head into an oil/gas phase 205 and a water phase 206. The well stream 204 may e.g. be water comprising 1000 ppm of impurities (gas/oil). Subsequent to treatment in tank 1 the water stream in line 207 from the second outlet 3 comprises 100 ppm impurities. The stream 207 is fed to inlet 2' for treatment in tank 1', and the water stream in line 208 from the second outlet 3' from tank 1' comprises 10 ppm impurities. The stream 208 is finally fed to inlet 2" for treatment in tank 1", thus providing a water stream 206 from outlet 3" with less than 5 ppm impurities.

The tanks 1, 1' and 1" are provided with a conduit 102 connecting the gas zone in the tank with an eductor in the inlet 2, inlet 2', and inlet 2", respectively.

This arrangement may optionally be used for further treatment of the water stream from the second outlet 3" from tank 1" in the tank arrangement illustrated in FIG. 4 (Example 1). The oil/gas phase may be separated into oil and gas by treatment in a further tank as described in Example 1. Optionally the oil/gas phase may be separated in two or more tanks in series.

3. Use of Separator Tanks According to the Invention as Separators in Parallel.

FIG. 6 schematically depicts an arrangement where two tanks 1 and 1' are used in parallel. Well fluid from a well head part streams 303 and 304 enters tanks 1 and 1' at inlets 2 and 2'. An oil/gas phase is taken out at 305 and a water phase is taken out at 306. The oil/gas phase and the water phase may be further treated as described in Examples 1 and 2.

The tanks 1 and 1' are provided with a conduit 102 connecting the gas zone in the tank with an eductor in the inlet 2 and inlet 2', respectively.

FIGS. 1 to 6 are only schematical and the arrangements may comprise further equipment normally used in oil and gas production like e.g. valves, pumps, compressors, further pipelines, which are excluded for simplicity. However, the arrangement described above can easily be adapted for specific use by a skilled person.

Moreover, it is evident that the separator tanks according to the invention can be used in combination in any desired arrangement, e.g. in series and/or in parallel. The separator tanks and the method and the use according to the present invention can be modified within the scope of the appended patent claims. Details of the various embodiments can be combined into new embodiments within the scope of the patent claims. It is e.g. possible to provide an individual tank with two or more first outlets and/or with two or more second outlets and/or with two or more inlets. The first outlet can be provided with a valve, and both the first outlet and the second outlet can be provided with a valve. The first outlet and/or the second outlet can be mounted at other locations than coaxial with centre line C, such as parallel with the centre line C, but at a distance from the centre line. The eductor used in the inlet can be replaced with another mixing device for mixing gas and fluid, or with a mixing device in the inlet in combination with a pump in conduit 102 for withdrawing the gas from the gas zone. Such an embodiments is however less favourable because it is more complicated and not like the embodiment of FIG. 3 an automatic, self-regulating system which is independent from outside supplies and has no moving parts. The system illustrated in FIG. 3 for taking out gas from a gas zone 101 in the upper part 9 of the separator tank and feeding the gas to the inlet of the same tank may be used also in connection with separator tanks of other designs that the design illustrated on FIGS. 1 and 2 and claimed in claim 1.

The invention claimed is:

1. A separator tank for separation of fluid comprising water, oil and gas, which separator tank comprises an essentially cylindrical vertical tank having an upper part and a lower part, a tangentially arranged inlet for fluid, an inner annular wall, at least one first outlet in the upper part of the tank, and at least one second outlet in the lower part of the tank; wherein said inner annular wall has a first opening at an upper end of said inner annular wall to allow communication between the upper part and the lower part of the tank, and wherein the separator tank includes a rod-shaped vortex eye breaker extending at the centre of the tank.

2. The separator tank according to claim 1, wherein the vortex eye breaker extends from the lower part of the tank and upward past a lower rim of the inner annular wall.

3. The separator tank according to claim 1, wherein an upper end of the vortex eye breaker is located at a distance below the first opening in the inner annular wall.

4. The separator tank according to claim 1, wherein said rod-shaped vortex eye breaker extends vertically.

5. The separator tank according to claim 1, wherein said rod-shaped vortex eye breaker is co-axial with the tank.

6. The separator tank according to claim 1, wherein the rod-shaped vortex eye breaker has a length in the range from ½ to ⅚ of the height of the tank.

7. The separator tank according to claim 1, wherein the inner annular wall is cylindrical.

8. The separator tank according to claim 1, wherein the inner annular wall is a conical frusta shaped wall.

9. The separator tank according to claim 1, wherein the second outlet is located a larger distance from the inner annular wall than the distance between the inner annular wall and the first outlet.

10. The separator tank according to claim 1, wherein the first outlet is coaxial with the first opening.

11. The separator tank according to claim 1, wherein the rod-shaped vortex eye breaker is coaxial with the first opening.

12. The separator tank according to claim 1, wherein the first opening and the first outlet and the second outlet are coaxial.

13. The separator tank according to claim 1, further comprising a gas and fluid mixing device.

14. The separator tank according to claim 13, wherein the gas and fluid mixing device is provided at the tangentially arranged inlet.

15. The separator tank according to claim 13, wherein a gas source for the gas and fluid mixing device is a gas zone in the upper part of the separator tank.

16. The separator tank according to claim 1, wherein the separator tank is provided above the second outlet with one of a disc with a circular circumference, a disc with a circular circumference placed horizontally, a conical member, a hemispherical shaped member, and a disc-shaped plate.

* * * * *